US012738398B2

(12) United States Patent
Ohmura

(10) Patent No.: US 12,738,398 B2
(45) Date of Patent: Sep. 15, 2026

(54) HERMETIC ELECTRICAL FEEDTHROUGH

(71) Applicant: KYOCERA Corporation, Kyoto (JP)

(72) Inventor: Haruka Ohmura, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 259 days.

(21) Appl. No.: 18/696,936

(22) PCT Filed: Sep. 28, 2022

(86) PCT No.: PCT/JP2022/036263
§ 371 (c)(1),
(2) Date: Mar. 28, 2024

(87) PCT Pub. No.: WO2023/054512
PCT Pub. Date: Apr. 6, 2023

(65) Prior Publication Data

US 2024/0395442 A1 Nov. 28, 2024

(30) Foreign Application Priority Data

Sep. 29, 2021 (JP) ................................ 2021-159883

(51) Int. Cl.
*H01B 17/30* (2006.01)
*F04D 19/04* (2006.01)

(52) U.S. Cl.
CPC ......... *H01B 17/305* (2013.01); *F04D 19/042* (2013.01)

(58) Field of Classification Search
CPC ....... H01B 17/305; H01R 9/16; F04D 19/042; F04D 25/0693
USPC .......................................................... 174/659
See application file for complete search history.

(56) References Cited

U.S. PATENT DOCUMENTS

| | | | | |
|---|---|---|---|---|
| 4,308,323 | A * | 12/1981 | Bowsky | H01M 50/191 429/174 |
| 4,572,877 | A * | 2/1986 | Botos | H01M 50/342 429/174 |
| 4,786,762 | A * | 11/1988 | Bowsky | H01B 17/303 439/935 |
| 9,527,157 | B2 * | 12/2016 | Kroll | H01M 10/0525 |
| 2012/0018216 | A1 * | 1/2012 | Harada | H01B 17/305 174/650 |

FOREIGN PATENT DOCUMENTS

| | | | |
|---|---|---|---|
| JP | 11016620 | A | 1/1999 |
| JP | 2004-006209 | A | 1/2004 |

* cited by examiner

*Primary Examiner* — Timothy J Thompson
*Assistant Examiner* — Michael F Mcallister
(74) *Attorney, Agent, or Firm* — Procopio, Cory, Hargreaves & Savitch LLP

(57) ABSTRACT

A hermetic terminal according to the present disclosure includes a metal sleeve having a tubular shape, a ceramic substrate fixed to an inner peripheral surface of the metal sleeve and including a first through hole along an axial direction of the metal sleeve, an annular member including a second through hole located coaxially with the first through hole, and a conductive member having a columnar shape, inserted into the first through hole and the second through hole, and brazed to the ceramic substrate and the annular member. An inner peripheral surface of the annular member facing the conductive member includes a first region curved in a direction away from the conductive member.

15 Claims, 3 Drawing Sheets

HERMETIC ELECTRICAL FEEDTHROUGH

BACKGROUND OF INVENTION

In the related art, in a vacuum pump such as a turbomolecular pump, a hermetic terminal is used to supply an electric signal from the outside of the vacuum pump to the inside that is a vacuum space. Such a hermetic terminal generally includes a tubular metal sleeve, a disk-shaped insulating base brazed to an inner peripheral surface of the metal sleeve and having a through hole in an axial direction, and a lead pin (conductive member) having a washer (annular member) fixed to the through hole.

As such a hermetic terminal, for example, Patent Document 1 discloses a hermetic terminal in which a metal layer (metallized layer) is formed on an inner peripheral surface of a through hole to a depth of 200 μm to 5 mm from a peripheral edge of the through hole of an insulating base and an opening portion of the through hole. A washer and a lead pin are fixed to the metal layer by brazing.

CITATION LIST

Patent Literature

Patent Document 1: JP 11-16620 A

SUMMARY

Solution to Problem

A hermetic terminal according to the present disclosure includes a metal sleeve having a tubular shape, a ceramic substrate fixed to an inner peripheral surface of the metal sleeve and including a first through hole along an axial direction of the metal sleeve, an annular member including a second through hole located coaxially with the first through hole, and a conductive member having a columnar shape, inserted into the first through hole and the second through hole, and brazed to the ceramic substrate and the annular member. An inner peripheral surface of the annular member facing the conductive member includes a first region curved in a direction away from the conductive member. A vacuum pump according to the present disclosure includes the hermetic terminal.

DESCRIPTION OF EMBODIMENTS

As described above, in a case in which the washer and the lead pin are fixed to the metal layer by brazing, when the straightness of an inner peripheral surface of the washer is less and a distance between the inner peripheral surface of the washer and an outer peripheral surface of the lead pin is great, the lead pin may be obliquely fixed to the insulating base. In such a case, wiring work for connection to a tip end of the lead pin may be difficult. On the other hand, when the distance between the inner peripheral surface of the washer and the outer peripheral surface of the lead pin is less, a sufficient amount of a brazing material is not able to flow between the inner peripheral surface of the washer and the outer peripheral surface of the lead pin. As a result, many voids may remain between the inner peripheral surface of the washer and the outer peripheral surface of the lead pin, resulting in poor bonding strength and airtightness.

An object of the present disclosure is to provide a hermetic terminal in which wiring work for connection to a tip end of a lead pin is easy and voids that may occur between an inner peripheral surface and an outer peripheral surface are suppressed.

As described above, in the hermetic terminal according to the present disclosure, an inner peripheral surface of an annular member facing a conductive member has a first region curved toward an outer peripheral surface. With such a structure, a contact area of a brazing material with respect to the inner peripheral surface of the annular member can be increased. Consequently, according to the hermetic terminal of the present disclosure, wiring work for connection to the tip end of the lead pin is easy, and voids that may occur between the inner peripheral surface and the outer peripheral surface are suppressed.

Figure 1:
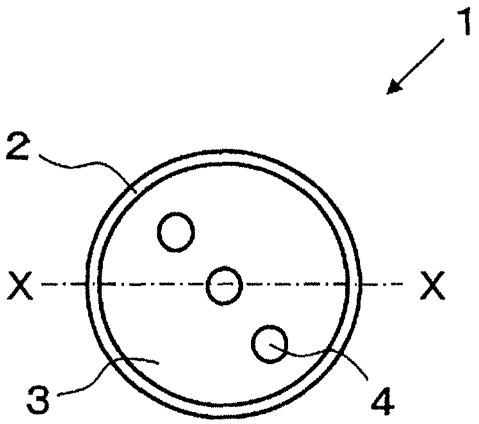
FIG. 1 is a plan view illustrating a hermetic terminal according to an embodiment of the present disclosure.

A hermetic terminal according to an embodiment of the present disclosure is described with reference to FIGS. 1 to 3. A hermetic terminal 1 according to an embodiment illustrated in FIG. 1 includes a metal sleeve 2, a ceramic substrate 3, and a conductive member 4. FIG. 1 is a plan view illustrating the hermetic terminal 1 according to an embodiment.

The metal sleeve 2 has a tubular shape, and the shape of the metal sleeve 2 is not limited to a cylindrical shape, a square tubular shape (for example, a triangular tubular shape, a quadrangular tubular shape, a pentagonal tubular shape, a hexagonal tubular shape, or the like), or the like as long as the metal sleeve 2 has a tubular shape. The size of the metal sleeve 2 may be appropriately set in accordance with a device or the like to be provided with the hermetic terminal 1. The metal sleeve 2 has a length from 15 mm to 30 mm and an outer diameter of the outermost circumference from 20 mm to 30 mm, for example. In the case of a square tubular shape, the outer diameter means the length of the longest outer edge. The metal sleeve 2 is made of metal such as carbon steel, low alloy steel, tool steel, stainless steel, iron, copper, copper alloy, titanium, titanium alloy, molybdenum, molybdenum alloy, Fe—Ni alloy, Fe—Ni—Cr—Ti—Al alloy, Fe—Cr—Al alloy, Fe—Co—Cr alloy, Fe—Co alloy, Fe—Co—C alloy, Fe—Ni alloy, or Fe—Ni—Co alloy.

The carbon steel is an alloy of Fe and 0.02 mass % to 2.14 mass % of C, and contains Si, Mn, P, and S in addition to C. Such carbon steel includes, for example, S10C, S12C, S15C, S17C, S20C, S22C, S25C, S28C, S30C, S33C, S35C, S38C, S40C, S43C, S45C, S48C, S50C, S53C, S55C, S58C, S60C, S65C, S70C, and S75C defined in JIS G 4051:2016. The low alloy steel refers to carbon steel containing at least one selected from the group consisting of Al, B, Co, Cr, Cu, La, Mo, Nb, Ni, Pb, Se, Te, Ti, V, W, and Zr, and having a total content of these elements of 5 mass % or less.

The tool steel refers to a carbon tool steel material defined by JIS G 4401:2009 and an alloy tool steel material defined by JIS G 4404:2006.

The stainless steel refers to an alloy of Fe and 10.5 mass % or more of Cr and having a C content of 1.2% or less, and components other than this are defined by ISO 15510:2014, for example. Examples of the stainless steel include SUS304, SUS304L, SUS304ULC, SUS310ULC, and SUSXM15J1.

The ceramic substrate 3 is a member for fixing the conductive member 4 to be described below in the metal sleeve 2. As illustrated in FIGS. 1 and 2, the ceramic substrate 3 is fixed by an outer peripheral surface of the ceramic substrate 3 and an inner wall surface of the metal sleeve 2. That is, the ceramic substrate 3 is formed in accordance with an inner diameter of the metal sleeve 2. The ceramic substrate 3 may be thick enough to fix the conductive member 4, and has a thickness from 4 mm to 10 mm, for example. FIG. 2 is an explanatory view for explaining a cross section taken along line X-X illustrated in FIG. 1.

The ceramic substrate 3 is not limited as long as the ceramic substrate 3 is made of ceramic. Examples of such ceramic include ceramic containing aluminum oxide, aluminum nitride, silicon carbide, or silicon nitride as a main component.

In the present description, the "main component" refers to a component accounting for 80 mass % or more among the total of 100 mass % of the components constituting the ceramic. The identification of each component contained in the ceramic may be performed with an X-ray diffractometer using a CuKα beam, and the content of each component may be determined, for example, with an inductively coupled plasma (ICP) emission spectrophotometer or a fluorescence X-ray spectrometer.

The ceramic substrate 3 has a first through hole 3*a* along an axial direction of the metal sleeve 2. The first through hole 3*a* is a through hole for inserting the conductive member 4, and a diameter of the first through hole 3*a* is appropriately set in accordance with an outer diameter of the conductive member 4. At least one first through hole 3*a* is formed in the ceramic substrate 3, and the first through hole 3*a* is appropriately set in accordance with the number of conductive members 4 to be inserted.

Figure 2:
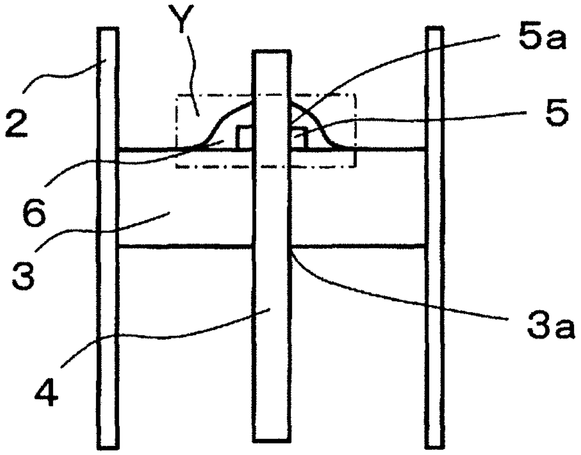
FIG. 2 is an explanatory view for explaining a cross section taken along line X-X illustrated in FIG. 1.

As illustrated in FIG. 2, an annular member 5 is located on a surface of the ceramic substrate 3. The annular member 5 corresponds to a washer and is made of metal such as carbon steel, low alloy steel, tool steel, stainless steel, iron, copper, copper alloy, titanium, titanium alloy, molybdenum, molybdenum alloy, Fe—Ni alloy, Fe—Ni—Cr—Ti—Al alloy, Fe—Cr—Al alloy, Fe—Co—Cr alloy, Fe—Co alloy, Fe—Co—C alloy, Fe—Ni alloy, or Fe—Ni—Co alloy. The definitions of the carbon steel, the low alloy steel, the tool steel, and the stainless steel are as described above.

The annular member 5 is not limited as long as the annular member 5 is less than the width and thickness of the ceramic substrate 3 and has a size capable of inserting the conductive member 4. As for the size of the annular member 5, for example, an outer diameter of the annular member 5 is from about 1.2 times to 2 times the outer diameter of the conductive member 4, and particularly may be from 1.4 times to 1.8 times. The thickness of the annular member 5 is, for example, from 0.1 mm to 0.5 mm.

The annular member 5 has a second through hole 5*a* located coaxially with the first through hole 3*a* formed in the ceramic substrate 3. The second through hole 5*a* is a through hole for inserting the conductive member 4, and a diameter of the second through hole 5*a* is appropriately set in accordance with the outer diameter of the conductive member 4.

The conductive member 4 corresponds to a lead pin, and the shape of the conductive member 4 is not limited as long as the conductive member 4 has a columnar shape such as a cylindrical shape or a prism shape (for example, a triangular prism shape, a quadrangular prism shape, a pentagonal prism shape, a hexagonal prism shape, or the like). The length and the outer diameter of the conductive member 4 are appropriately set in accordance with, for example, the size of the metal sleeve 2. The conductive member 4 is made of metal such as copper or oxygen-free copper (for example, alloy number C1020 specified in JIS H 3100:2012, alloy number C1011 specified in JIS H 3510:2012, or the like). At least one conductive member 4 may be included, and may be appropriately set in accordance with the use or the like of the hermetic terminal 1.

The conductive member 4 is inserted into the first through hole 3*a* formed in the ceramic substrate 3 and the second through hole 5*a* formed in the annular member 5, and is fixed to the ceramic substrate 3. Specifically, the conductive member 4 is brazed to the surface of the ceramic substrate 3 by using a brazing material 6 to cover the annular member 5. Examples of the brazing material 6 include an Ag—Cu—Ti brazing material, BAg-8, BAg-8A, BAg-8B, and BAg-9. In the Ag—Cu—Ti brazing material, for example, Cu is 35 mass % to 50 mass %, Ti is 1 mass % to 8 mass %, and the remainder is silver (Ag), for example, in a total of 100 mass % of Ag, Cu, and Ti.

Figure 3:
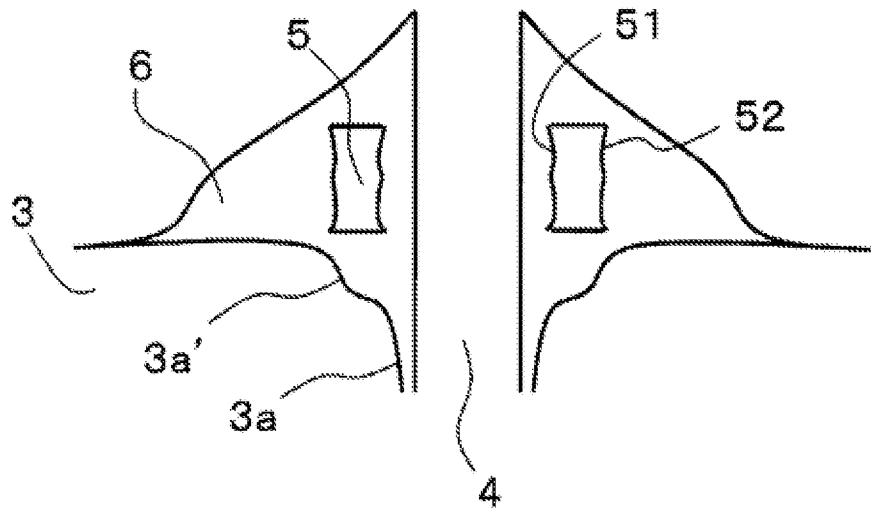
FIG. 3 is an enlarged explanatory view for explaining a region Y illustrated in FIG. 2.

As illustrated in FIG. 3, the annular member 5 in the hermetic terminal 1 has a first region 51 where an inner peripheral surface facing the conductive member 4 is curved toward an outer peripheral surface. FIG. 3 is an enlarged explanatory view for explaining a region Y illustrated in FIG. 2. Since the annular member 5 has such a first region 51, a contact area of the brazing material 6 with respect to the inner peripheral surface of the annular member 5 can be increased. As a result, the airtightness and the bonding strength of the annular member 5 to the conductive member 4 can be improved.

On the inner peripheral surface of the annular member 5, the first region 51 may be provided at only one location or a plurality of locations. Since the inner peripheral surface of the annular member 5 includes the plurality of first regions 51, the contact area of the brazing material 6 with respect to the inner peripheral surface of the annular member 5 can be further increased. As a result, the airtightness and the bonding strength of the annular member 5 to the conductive member 4 can be further improved.

The curvature of the first region 51 is not limited and is preferably, for example, 0.6 (1/mm) or more. When the first region 51 is present in a plurality of locations, the curvature of each first region 51 is preferably 0.6 (1/mm) or more. When the curvature of the first region 51 is 0.6 (1/mm) or more, the contact area of the brazing material 6 with respect to the inner peripheral surface of the annular member 5 can be further increased. As a result, the airtightness and the bonding strength of the annular member 5 to the conductive member 4 can be further improved. The upper limit of the curvature of the first region 51 may be, for example, 1.2 (1/mm).

In order to obtain the curvature of the first region 51, the entire annular member 5 is first captured using a scanning electron microscope with a cross section including an axis of the conductive member 4 as a target. The curvature of the first region 51 may be obtained by tracing the inner peripheral surface of the annular member 5 displayed in the captured image. The magnification of the image is, for example, 35 times, but the magnification may be appropriately adjusted so that the entire annular member 5 is captured.

In order to fix the annular member 5 for a long period of time, a brazing portion interposed between the inner peripheral surface of the annular member 5 and the outer peripheral surface of the conductive member 4 preferably has less voids. Specifically, the void ratio of the brazing portion interposed between the inner peripheral surface of the annular member 5 and the outer peripheral surface of the conductive member 4 is preferably 1% or less in a cross-sectional view including the axis of the conductive member 4. An area of the brazing portion is an area of only a portion interposed between the inner peripheral surface of the annular member 5 and the outer peripheral surface of the conductive member 4 (that is, excluding the brazing material 6 located above an upper surface of the annular member 5 and the brazing material 6 located below a lower surface of the annular member 5) in the above image. The void ratio is a percentage of voids existing in the brazing portion when the area of the brazing portion is 100%.

As illustrated in FIG. 3, an outer peripheral surface of the annular member 5 may be further formed with a second region 52 curved toward the inner peripheral surface. Since the annular member 5 includes such a second region 52, the contact area of the brazing material 6 with respect to the outer peripheral surface of the annular member 5 can be increased. As a result, even though an impact is applied from the outer peripheral side, the annular member 5 can be fixed for a long period of time.

On the outer peripheral surface of the annular member 5, the second region 52 may be provided at only one location or a plurality of locations. Since the outer peripheral surface of the annular member 5 includes the plurality of second regions 52, the contact area of the brazing material 6 with respect to the outer peripheral surface of the annular member 5 can be further increased. As a result, even though an impact is applied from the outer peripheral side, the annular member 5 can be fixed for a longer period of time.

The curvature of the second region 52 is not limited and is preferably, for example, 0.6 (1/mm) or more. When the second region 52 is present in plural, the curvature of each second region 52 is preferably 0.6 (1/mm) or more. When the curvature of the second region 52 is 0.6 (1/mm) or more, the contact area of the brazing material 6 with respect to the outer peripheral surface of the annular member 5 can be further increased. As a result, even though an impact is applied from the outer peripheral side, the annular member 5 can be fixed for a longer period of time. The upper limit of the curvature of the second region 52 may be, for example, 1.2 (1/mm). The curvature of the second region 52 can be obtained by the same method as the method of obtaining the curvature of the first region 51.

As illustrated in FIG. 3, the first through hole 3*a* formed in the ceramic substrate 3 may have a first opening portion 3*a*' opened in an inverted frustum shape on the side where the annular member 5 is installed. When the first opening portion 3*a*' has a shape opened in the inverted frustum shape, stress in the ceramic substrate 3 in the vicinity of the first opening portion 3*a*' is more dispersed than when the first opening portion 3*a*' has a shape other than the inverted frustum shape. As a result, even though heating and cooling are repeated, cracks or the like are less likely to occur in the ceramic substrate 3, and the ceramic substrate 3 can be used for a long period of time. The inverted frustum shape may be an inverted truncated cone shape, an inverted truncated pyramidal shape, or the like in accordance with the shape of the conductive member 4 (the shape of the first through hole 3*a*). As illustrated in FIG. 1, when the conductive member 4 has a cylindrical shape, the inverted frustum shape is an inverted truncated cone shape.

Although not illustrated, the first through hole 3*a* formed in the ceramic substrate 3 may have a second opening portion opened in an inverted frustum shape on a side opposite to the side where the annular member 5 is installed. When the second opening portion has a shape opened in an inverted frustum shape, stress in the ceramic substrate 3 in the vicinity of the second opening portion is more dispersed than when the second opening portion has a shape other than an inverted frustum shape. As a result, even though heating and cooling are repeated, cracks or the like are less likely to occur in the ceramic substrate 3, and the ceramic substrate 3 can be used for a long period of time. The inverted frustum shape may be an inverted truncated cone shape, an inverted truncated pyramidal shape, or the like in accordance with the shape of the conductive member 4 (the shape of the first through hole 3*a*). As illustrated in FIG. 1, when the conductive member 4 has a cylindrical shape, the inverted frustum shape is an inverted truncated cone shape.

In the first through hole 3*a* formed in the ceramic substrate 3, the first opening portion 3*a*' and the second opening portion are preferably symmetrical with respect to a virtual plane perpendicular to an axial direction of the first through hole 3*a* and passing through the center of the thickness of the ceramic substrate 3. With such a configuration, uneven distribution of stress in the thickness direction (axial direction) of the ceramic substrate 3 is suppressed. As a result, cracks or the like are less likely to occur in the ceramic substrate 3, and the ceramic substrate 3 can be used for a long period of time.

As illustrated in FIG. 3, the brazing material 6 may form a fillet from above the upper surface of the annular member 5 toward the outside of the outer peripheral surface of the annular member 5. Since the brazing material 6 forms the fillet, the contact area of the brazing material 6 with respect to the ceramic substrate 3, the conductive member 4, and the annular member 5 can be increased. When a metallized layer (not illustrated) and a plating layer (not illustrated) covering the metallized layer are provided on the surface of the ceramic substrate 3, the contact area of the brazing material 6 with respect to the plating layer can be increased instead of the ceramic substrate 3. As a result, even though an outward pulling force is applied, peeling is less likely to occur, and the ceramic substrate 3 can be used for a long period of time.

When a metallized layer and a plating layer covering the metallized layer are provided on the surface of the ceramic substrate 3 to surround the conductive member 4, an average value of a cut level difference Rδc1 representing a difference between a cut level at a load length ratio of 25% in a roughness curve of a surface of the plating layer and a cut level at a load length ratio of 75% in the roughness curve may be greater than an average value of a cut level difference Rδc2 representing a difference between a cut level at a load length ratio of 25% in a roughness curve of an exposed portion of the surface of the ceramic substrate 3 and a cut level at a load length ratio of 75% in the roughness curve.

When the average value of the cut level difference Rδc1 is greater than the average value of the cut level difference Rδc2, an anchor effect of the brazing portion is enhanced, so that the bonding strength of the brazing portion to the plating layer can be enhanced. In this case, the average value of the cut level difference Rδc2 is less than the average value of the cut level difference Rδc1. Therefore, voids are less likely to occur between the surface of the ceramic substrate 3 and the metallized layer, and the adhesion of the metallized layer to the ceramic substrate 3 is improved. Variations in the thickness of the metallized layer are also suppressed.

The cut level differences Rδc1 and Rδc2 can be measured using a shape analysis laser microscope (manufactured by KEYENCE Corporation, ultra-deep color 3D shape measuring microscope (VK-X1100 or successor models thereof)). The measurement conditions are as follows: an illumination method of coaxial illumination, a magnification of 60 times, a cutoff value λs of "None", a cutoff value λc of 0.8 mm, a cutoff value λf of "None", and a termination effect correction of "On". The measurement is performed on the surface of the plating layer around the conductive member 4 and the exposed portion of the surface of the ceramic substrate 3, and for example, the measurement range per location is set to 5657 μm×4232 m. When obtaining the cut level difference Rδc1, a circumferential C1 to be measured centered on the axial center of the conductive member 4 is drawn on the surface of the plating layer. A length per circumference is, for example, from 6.2 mm to 6.6 mm. When obtaining the cut level difference Rδc2, a circumferential C2 is drawn on the exposed portion of the surface of the ceramic substrate 3 coaxially with the circumferential C1. A length per circumference is, for example, from 7.8 mm to 8.3 mm. The respective measured values of the cut level differences Rδc1 and Rδc2 may be obtained to be the same number as the number of the conductive members 4, and the average value of the obtained values may be calculated. When the number of the conductive members 4 is 1, the measured value of the cut level difference Rδc1 and the measured value of the cut level difference Rδc2 may be compared with each other.

For example, the average value of the cut level difference Rδc1 is from 4 μm to 7 μm, and the average value of the cut level difference Rδc2 is from 1 μm to 2 μm. In particular, a difference between the average value of the cut level differences Rδc1 and the average value of the cut level differences Rδc2 may be from 2 μm to 5 μm.

The metallized layer contains, for example, molybdenum as a main component and contains manganese. In this case, out of 100 mass % of the components constituting the metallized layer, for example, the content of manganese is from 10 mass % to 30 mass % and the remainder is molybdenum. The thickness of the metallized layer is, for example, several tens of μm. The plating layer may contain, for example, nickel as a main component and contain phosphorus or boron. The thickness of the plating layer is, for example, several μm.

Figure 4:
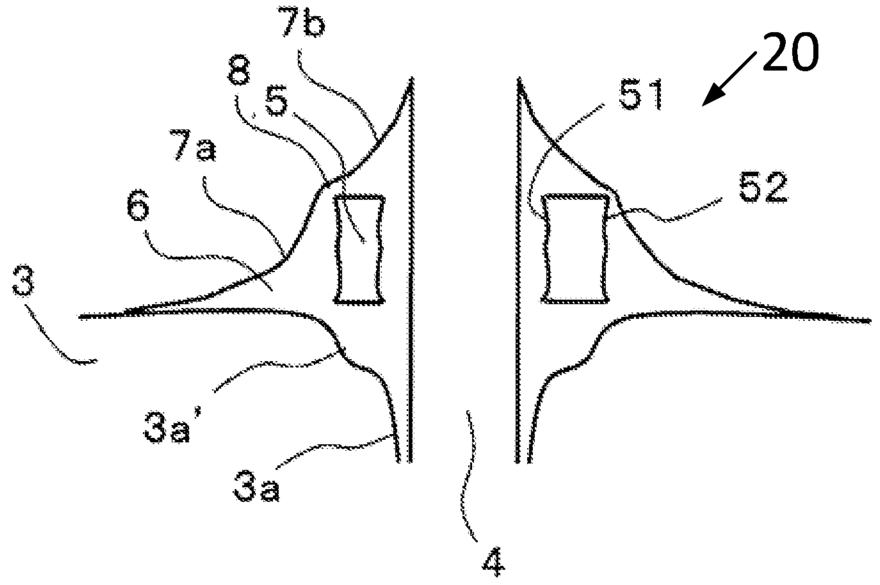
FIG. 4 is an enlarged explanatory view for explaining another embodiment of the region Y illustrated in FIG. 2.

A hermetic terminal 20 according to another embodiment of the present disclosure is described with reference to FIG. 4. A configuration different from an embodiment is described. As illustrated in FIG. 4, the cross-sectional profile of the brazing material 6 may have concave surfaces 7*a* and 7*b*. Since the concave surfaces 7*a* and 7*b* are provided, the volume of the brazing material 6 can be reduced as compared with when the concave surfaces 7*a* and 7*b* are not provided. Therefore, the stress applied to the ceramic substrate 3 is reduced, and the occurrence of cracks in the ceramic substrate 3 can be particularly suppressed. In particular, since the ceramic substrate 3 has the concave surface 7*a*, the stress applied to the ceramic substrate 3 is reduced.

A convex surface 8 is formed at the boundary between the concave surfaces 7*a* and 7*b*. A top of the convex surface 8 may be close to the intersecting line of between the upper surface and the outer peripheral surface of the annular member 5. When the top of the convex surface 8 is close to the intersecting line of between the upper surface and the outer peripheral surface of the annular member 5, the thickness of the brazing material is thin at a portion close to the convex surface 8. Therefore, the stress applied to the ceramic substrate 3 is reduced, and the occurrence of cracks in the ceramic substrate 3 can be particularly suppressed.

The average radius of curvature of the convex surface 8 may be from 60 μm to 190 μm. When the average radius of curvature of the convex surface 8 is from 60 μm to 190 μm, the bonding strength of the conductive member 4 to the ceramic substrate 3 is improved. Moreover, when a plurality of conductive members 4 are disposed along the axial direction of the metal sleeve 2, adjacent conductive members 4 can be suppressed from being short-circuited by the brazing material 6. When the conductive member 4 has a cylindrical shape, the convex surface 8 has an annular shape surrounding the conductive member 4.

The average radius of curvature of the convex surface 8 can be measured using a shape analysis laser microscope (manufactured by KEYENCE Corporation, ultra-deep color 3D shape measuring microscope (VK-X1100 or successor models thereof)). The profile measurement may be performed by setting the measurement conditions that an illumination method is coaxial illumination and a magnification is 120 times and setting the measurement range including the convex surface 8 to, for example, 2792 μm×2093 μm per location. Specifically, first, in one measurement range, four lines to be measured are drawn from the conductive member 4 side toward the ceramic substrate 3 side to include the convex surface 8.

A length of one line is, for example, from 200 μm to 300 μm. At least three measurement ranges are set, and the number of lines to be measured is at least 12. An average value of measured values obtained from the 12 lines to be measured is defined as the average radius of curvature of the convex surface 8.

Figure 5:
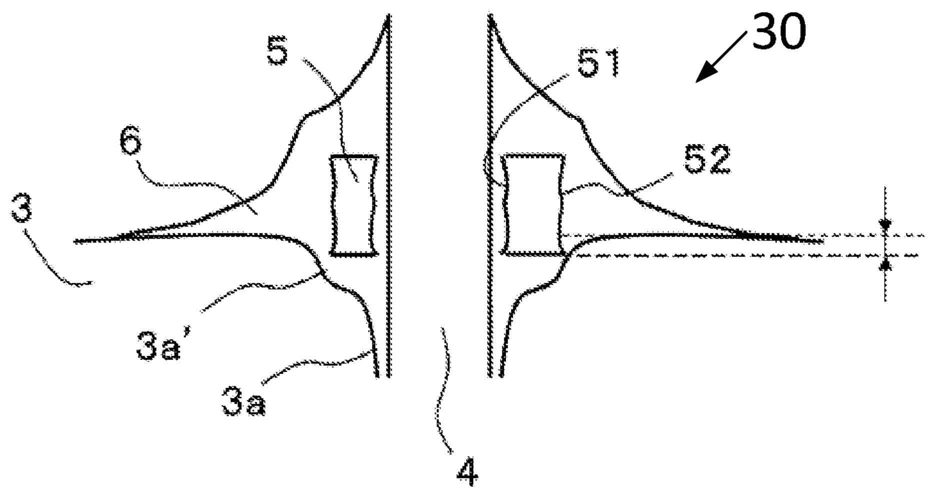
FIG. 5 is an enlarged explanatory view for explaining another embodiment of the region Y illustrated in FIG. 2.

A hermetic terminal 30 according to another embodiment of the present disclosure is described with reference to FIG. 5. A configuration different from an embodiment is described. As illustrated in FIG. 5, a part of the annular member 5 may be located inside the first opening portion 3*a*' of the ceramic substrate 3. That is, the lower surface of the annular member 5 may be located at a distance D from the surface of the ceramic substrate 3 toward the first opening portion 3*a*' in the axial direction of the first through hole 3*a*. With the structure illustrated in FIG. 5, the volume of the brazing material 6 in the through hole 3*a* is reduced by the annular member 5. Therefore, the stress applied to the ceramic substrate 3 close to the through hole 3*a* is reduced, and the occurrence of cracks in the ceramic substrate 3 can be particularly suppressed.

Figure 6:
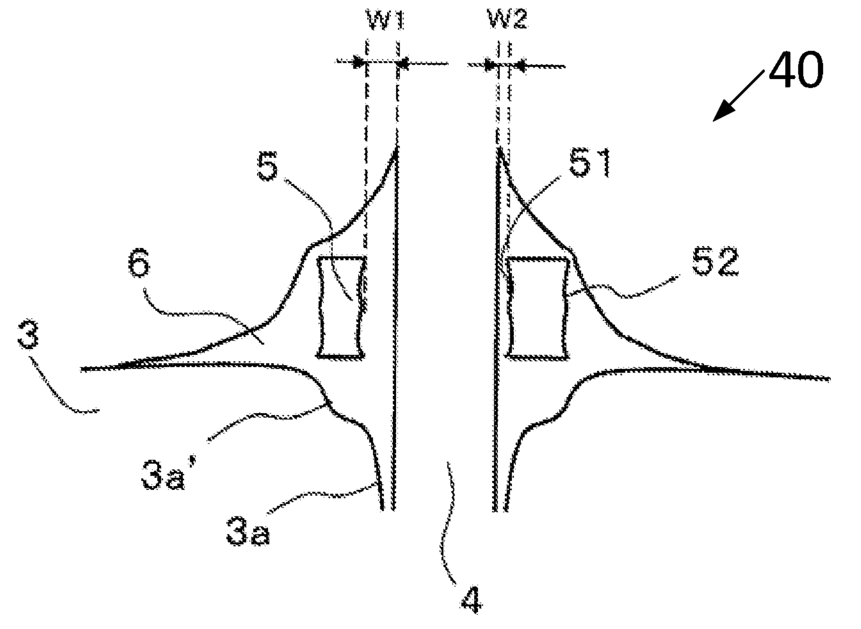
FIG. 6 is an enlarged explanatory view for explaining another embodiment of the region Y illustrated in FIG. 2.

A hermetic terminal 40 according to another embodiment of the present disclosure is described with reference to FIG. 6. A configuration different from an embodiment is described. As illustrated in FIG. 6, the distance between the outer peripheral surface of the conductive member 4 and the inner peripheral surface of the annular member 5 may not be uniform. In FIG. 6, the distance between the outer peripheral surface of the conductive member 4 and the inner peripheral surface of the annular member 5 is W1 on the left side of the drawing sheet and is W2 on the right side of the drawing sheet, and W1>W2. The hermetic terminal 40 preferably has such a structure. The reason is estimated as follows. When W1 is larger than W2, the volume of the brazing material 6 between the first region 51 and the conductive member 4 increases in a region on the left side of the drawing sheet. When W1 is larger than W2, the distance between the intersecting line of between the upper surface and the outer peripheral surface of the annular member 5 and the convex surface 8 can be reduced in the region on the left side of the drawing sheet.

On the other hand, in a region on the right side of the drawing sheet, the volume of the brazing material 6 between the first region 51 and the conductive member 4 increases. In the region on the right side of the drawing sheet, the volume of the brazing material 6 between the first region 51 and the conductive member 4 decreases. By unevenly distributing the brazing material 6 as described above, local concentration of stress on a part of the first opening portion 3*a*' of the ceramic substrate 3 is suppressed. As a result, the occurrence of cracks in the ceramic substrate 3 can be particularly suppressed.

The hermetic terminal 1 according to an embodiment is manufactured by, for example, the following procedure. First, the metal plate 2 is prepared. Subsequently, the ceramic substrate 3 is fixed to the inner peripheral surface of the metal sleeve 2. The annular member 5 is placed on the ceramic substrate 3 so that the first through hole 3*a* formed in the ceramic substrate 3 and the second through hole 5*a* formed in the annular member 5 overlap each other. Subsequently, the conductive member 4 is inserted into the first through hole 3*a* and the second through hole 5*a*, and the ceramic substrate 3 is fixed to the conductive member 4 and the annular member 5 with the brazing material 6 to cover the annular member 5. By adjusting the mass of the brazing material 6 and the brazing temperature, the void ratio of the brazing portion interposed between the inner peripheral surface of the annular member 5 and the outer peripheral surface of the conductive member 4 and the shape of the fillet to be formed can be controlled.

When a metallized layer and a plating layer covering the metallized layer are provided on the surface of the ceramic substrate 3 to surround the conductive member 4, the surface of the ceramic substrate 3 may be ground or polished in advance so that an average value of the cut level difference Rδc1 representing a difference between a cut level at a load length ratio of 25% in a roughness curve of a surface of the plating layer and a cut level at a load length ratio of 75% in the roughness curve may be greater than an average value of the cut level difference Rδc2 representing a difference between a cut level at a load length ratio of 25% in a roughness curve of the exposed portion of the surface of the ceramic substrate 3 and a cut level at a load length ratio of 75% in the roughness curve. By doing so, the hermetic terminal 1 according to an embodiment is obtained.

The hermetic terminal 20 according to another embodiment having the concave portions 7*a* and 7*b* and the convex portion 8 illustrated in FIG. 4 is manufactured by, for example, the following procedure. First, the metal plate 2 is prepared. Subsequently, the ceramic substrate 3 is fixed to the inner peripheral surface of the metal sleeve 2. Separately, the annular member 5 is coated with the brazing material 6 in advance. The annular member 5 coated with the brazing material 6 can be produced by, for example, applying a paste made of fine powder of the brazing material 6, an organic solvent, or the like to the entire periphery of the annular member 5, that is, the upper surface, the lower surface, the inner peripheral surface, and the outer peripheral surface, and heating and cooling the paste.

The annular member 5 is placed on the ceramic substrate 3 so that the first through hole 3*a* formed in the ceramic substrate 3 and the second through hole 5*a* (previously coated with the brazing material 6) formed in the annular member 5 overlap each other. Subsequently, the conductive member 4 is inserted into the first through hole 3*a* and the second through hole 5*a*, and the ceramic substrate 3 is fixed to the conductive member 4 and the annular member 5 with the brazing material 6 to cover the annular member 5. By doing so, the hermetic terminal 20 according to another embodiment is obtained.

The hermetic terminal 30 according to another embodiment in which a part of the annular member 5 is located inside the first opening portion 3*a*' of the ceramic substrate 3 illustrated in FIG. 5 is manufactured by, for example, the following procedure. First, the metal plate 2 is prepared. Subsequently, the ceramic substrate 3 is fixed to the inner peripheral surface of the metal sleeve 2. The annular member 5 is placed on the ceramic substrate 3 so that the first through hole 3*a* formed in the ceramic substrate 3 and the second through hole 5*a* formed in the annular member 5 overlap each other. When the annular member 5 is placed, the lower surface of the annular member 5 is positioned inside the first opening portion 3*a*' of the first through hole 3*a*, and then the annular member 5 is fixed. Subsequently, the conductive member 4 is inserted into the first through hole 3*a* and the second through hole 5*a*, and the ceramic substrate 3 is fixed to the conductive member 4 and the annular member 5 with the brazing material 6 to cover the annular member 5. By doing so, the hermetic terminal 30 according to another embodiment is obtained.

The hermetic terminals 40 in which the distances W1 and W2 illustrated in FIG. 6 are different from each other is manufactured by, for example, the following procedure. As a first manufacturing method, the metal sleeve 2 is first prepared. Subsequently, the ceramic substrate 3 is fixed to the inner peripheral surface of the metal sleeve 2. The annular member 5 is placed on the ceramic substrate 3 so that the first through hole 3*a* formed in the ceramic substrate 3 and the second through hole 5*a* formed in the annular member 5 overlap each other. Subsequently, the conductive member 4 is inserted into the first through hole 3*a* and the second through hole 5*a* so that the distance between the conductive member 4 and the annular member 5 is uneven. Subsequently, the annular member 4 and the conductive member 5 are fixed to each other with the brazing material 6.

As a second manufacturing method, the metal sleeve 2 is first prepared. Subsequently, the ceramic substrate 3 is fixed to the inner peripheral surface of the metal sleeve 2. The annular member 5 is placed on the ceramic substrate 3 so that the first through hole 3*a* formed in the ceramic substrate 3 and the second through hole 5*a* formed in the annular member 5 overlap each other. Subsequently, the conductive member 4 is inserted into the first through hole 3*a* and the second through hole 5*a*. Before fixing with the brazing material 6, the ceramic substrate 3 is inclined so that the axial direction of the annular member 5 is inclined at 10° to 30° with respect to a vertical direction. Subsequently, while the annular member 5 and the ceramic substrate 3 are held in the inclined state, the brazing material 6 is heated and cooled to fix the conductive member 4 and the annular member 5. By doing so, the hermetic terminal 40 according to another embodiment is obtained.

Alternatively, the ceramic substrate 3 may be fixed to the inner peripheral surface of the metal sleeve 2 after the conductive member 4 and the annular member 5 are fixed to the ceramic substrate 3 with the brazing material 6 in advance. The annular member 5 having the first region 51 in which the inner peripheral surface facing the conductive member 4 is curved in a direction away from the conductive member 4 can be obtained by preparing a metal plate-like body in advance and sequentially performing resist application, mask exposure, development, etching, and resist peeling.

The hermetic terminal 1 according to an embodiment is used in various devices. Examples of such devices include vacuum pumps and plasma processing devices such as plasma film forming devices, plasma etching devices, and plasma ashing devices.

REFERENCE SIGNS

1 Hermetic terminal
2 Metal sleeve
3 Ceramic substrate
3*a* First through hole
3*a*' First opening portion
4 Conductive member
5 Annular member
5*a* Second through hole
51 First region
52 Second region
6 Brazing material
7*a*, 7*b* Concave surface
8 Convex surface

The invention claimed is:

1. A hermetic terminal comprising:
a metal sleeve having a tubular shape;
a ceramic substrate fixed to an inner peripheral surface of the metal sleeve and comprising a first through hole along an axial direction of the metal sleeve;
an annular member comprising a second through hole located coaxially with the first through hole; and
a conductive member having a columnar shape, inserted into the first through hole and the second through hole, and brazed to the ceramic substrate and the annular member, wherein
an inner peripheral surface of the annular member facing the conductive member comprises a first region curved in a direction away from the conductive member.

2. The hermetic terminal according to claim 1, wherein the inner peripheral surface of the annular member comprises a plurality of the first regions.

3. The hermetic terminal according to claim 1, wherein a curvature of the first region is 0.6 (1/mm) or more.

4. The hermetic terminal according to claim 1, wherein a void ratio of a brazing portion located between the inner peripheral surface of the annular member and an outer peripheral surface of the conductive member is 1% or less in a cross-sectional view comprising an axis of the conductive member.

5. The hermetic terminal according to claim 1, wherein an outer peripheral surface of the annular member comprises a second region curved toward the inner peripheral surface of the annular member.

6. The hermetic terminal according to claim 5, wherein the outer peripheral surface of the annular member comprises a plurality of the second regions.

7. The hermetic terminal according to claim 5, wherein a curvature of the second region is 0.6 (1/mm) or more.

8. The hermetic terminal according to claim 1, wherein the first through hole comprises a first opening portion opened in an inverted frustum shape on a side of the first through hole where the annular member is installed.

9. The hermetic terminal according to claim 1, wherein the first through hole comprises a second opening portion opened in an inverted frustum shape on a side opposite to the side of the first through hole where the annular member is installed.

10. The hermetic terminal according to claim 9, wherein the first opening portion and the second opening portion are symmetrical with respect to a virtual plane perpendicular to an axial direction of the first through hole and extending through a center of a thickness of the ceramic substrate.

11. The hermetic terminal according to claim 1, wherein a brazing material comprises a fillet from above an upper surface of the annular member toward an outside of an outer peripheral surface of the annular member.

12. The hermetic terminal according to claim 8, wherein a part of the annular member is located inside the first opening portion.

13. The hermetic terminal according to claim 11, wherein the fillet comprises a convex surface and an average radius of curvature of the convex surface is from 60 μm to 190 μm.

14. The hermetic terminal according to claim 1, wherein, when a metallized layer and a plating layer covering the metallized layer are provided on a surface of the ceramic substrate to surround the conductive member, an average value of a cut level difference $R\delta c1$ representing a difference between a cut level at a load length ratio of 25% in a roughness curve of a surface of the plating layer and a cut level at a load length ratio of 75% in the roughness curve is greater than an average value of a cut level difference $R\delta c2$ representing a difference between a cut level at a load length ratio of 25% in a roughness curve of an exposed portion of the surface of the ceramic substrate and a cut level at a load length ratio of 75% in the roughness curve.

15. A vacuum pump comprising:
the hermetic terminal according to claim 1.

* * * * *